(12) United States Patent
Simkowski

(10) Patent No.: US 6,523,670 B1
(45) Date of Patent: Feb. 25, 2003

(54) ARTICLE CONVEYANCE HAVING LINE AND/OR SPACING ADJUSTMENT

(75) Inventor: Donald J. Simkowski, Loveland, CO (US)

(73) Assignee: Goldco Industries, Inc., Loveland, CO (US)

( * ) Notice: Subject to any disclaimer, the term of this patent is extended or adjusted under 35 U.S.C. 154(b) by 0 days.

(21) Appl. No.: 09/858,828

(22) Filed: May 17, 2001

(51) Int. Cl.$^7$ ................................................ B65G 47/26
(52) U.S. Cl. ........................................ 198/441; 198/438
(58) Field of Search .................................. 198/436, 438, 198/441, 450, 689.1

(56) References Cited

U.S. PATENT DOCUMENTS

| | | | | |
|---|---|---|---|---|
| 1,352,718 A | * | 9/1920 | Ayars ........................... | 198/441 |
| 3,721,340 A | * | 3/1973 | Kruse et al. ............. | 198/438 X |
| 5,113,996 A | * | 5/1992 | Francioni ..................... | 198/441 |
| 5,231,926 A | * | 8/1993 | Williams et al. ......... | 198/441 X |

FOREIGN PATENT DOCUMENTS

SU     1328267     *  8/1987     ................. 198/441

\* cited by examiner

Primary Examiner—James R. Bidwell
(74) Attorney, Agent, or Firm—Robert E. Harris

(57) ABSTRACT

Conveying apparatus and method are disclosed for receiving articles, such as cans, adjusting, or rearranging, the received articles between single and multiple lines during conveyance, and/or adjusting the spacing between the articles so that the articles are spaced from one another a preselected distance, including, if needed, equal spacing between the articles in the single and multiple lines. Rearrangement of the articles in single to multiple line mode (or, alternately, in multiple to single line mode) and/or control of spacing of the articles are/is effected by conveyance of the articles to and between a plurality of article actuators, each including a rotatable disk having negative pressure thereat for selectively establishing and maintaining engagement of the articles with the peripheral portions of the disks. The apparatus and method are also useful in conveying articles in article non-contact relationship with handling of the articles and line and/or spacing adjustment being effected within a limited area.

32 Claims, 5 Drawing Sheets

Fig_2

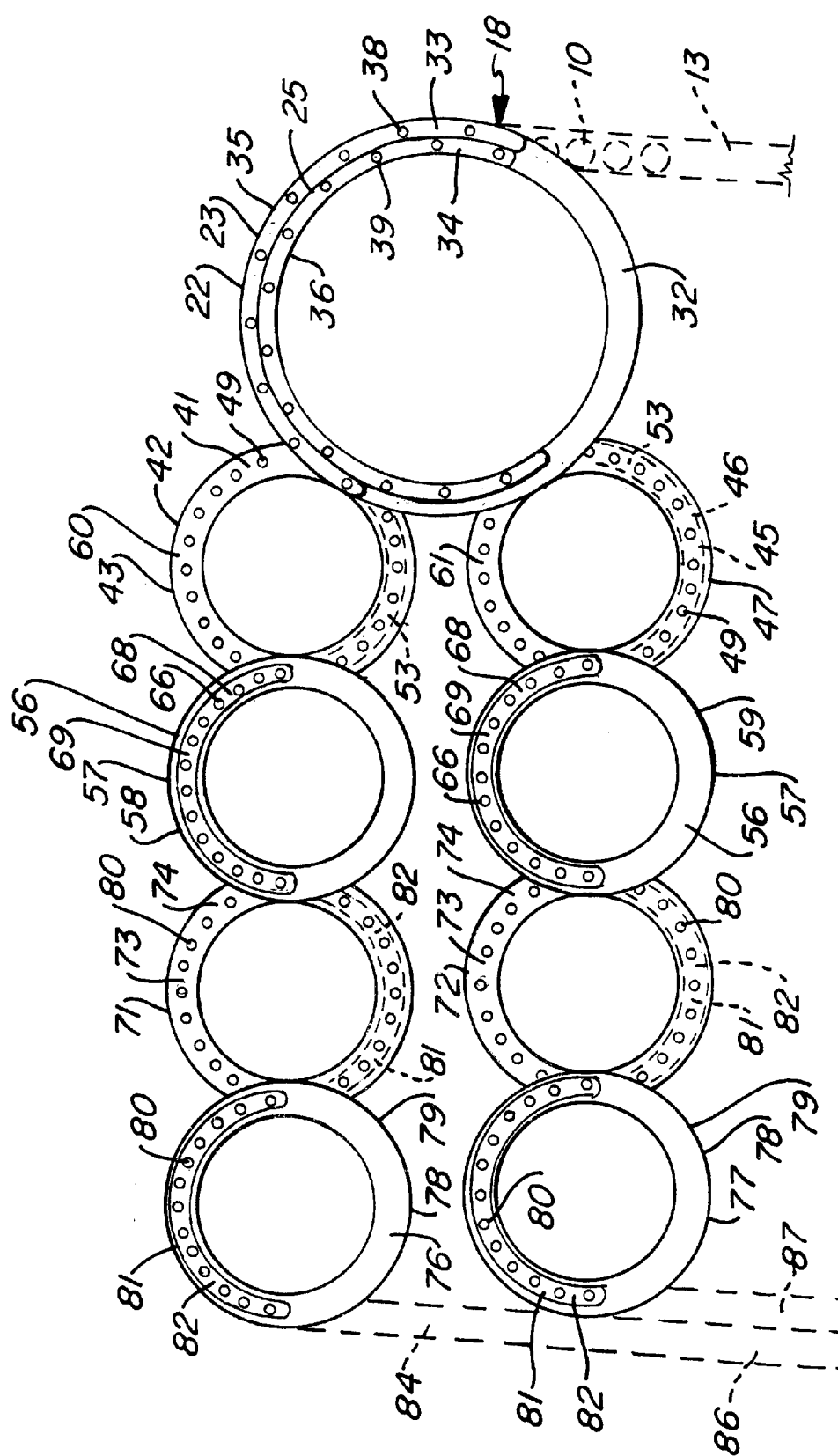
Fig_4

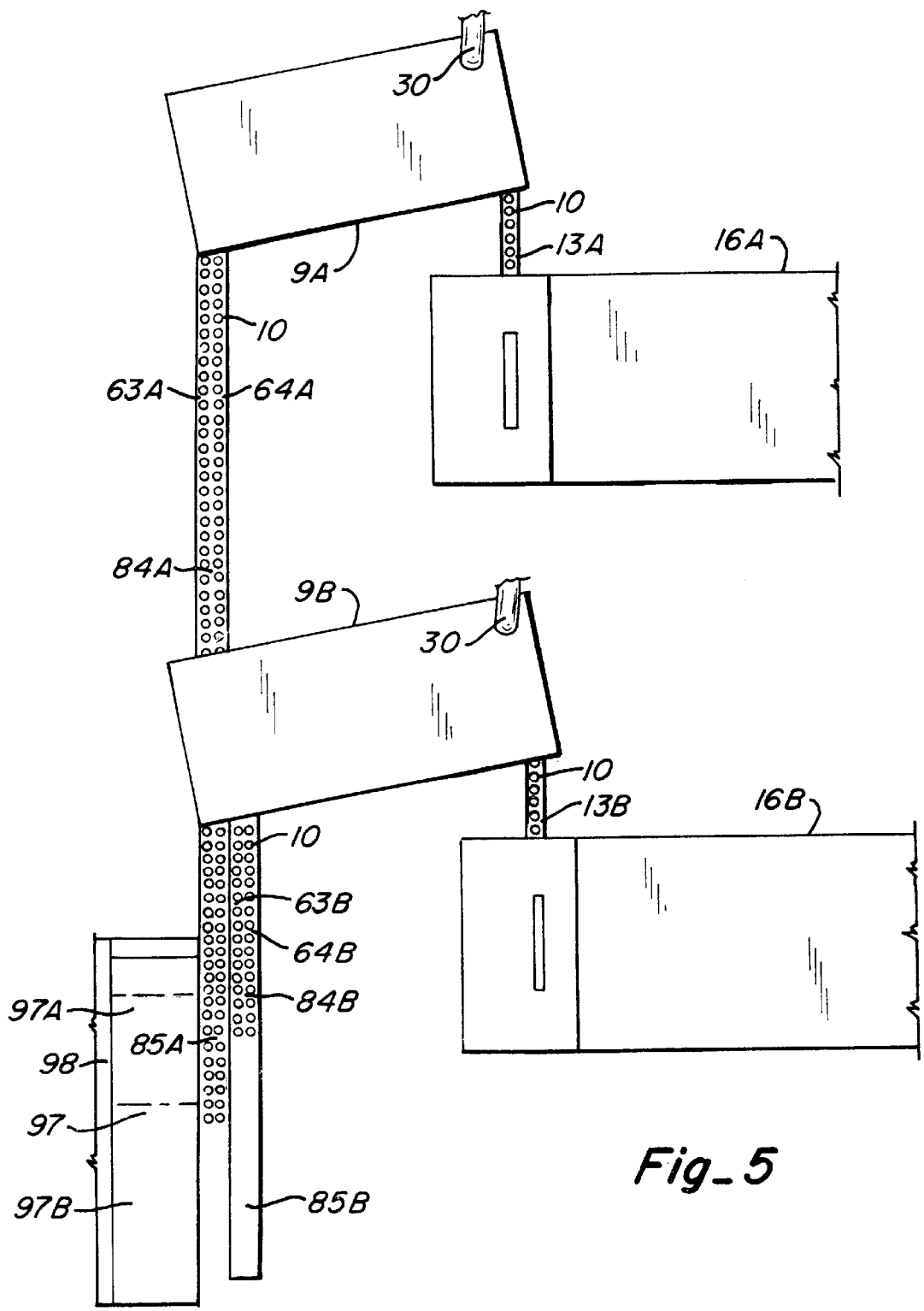
Fig_5

ARTICLE CONVEYANCE HAVING LINE AND/OR SPACING ADJUSTMENT

FIELD OF THE INVENTION

This invention relates to article conveyance, and, more particularly, relates to apparatus and method for article conveyance having spacing between articles and/or rearrangement of articles between single and multiple lines during conveyance.

BACKGROUND OF THE INVENTION

It is oftentimes necessary to convey articles, such as, for example, containers, between different locations, such as, again by way of example, moving cans from one location, or position, to another in connection with manufacture, processing and/or filling of the cans.

While articles may sometimes simply be moved in either single line, or file, or in mass, including multiple lines, or files, between locations, it is sometimes necessary that articles in single line be formed, or rearranged, into multiple lines during conveyance, or that articles in multiple lines be formed, or rearranged, into single line during conveyance, and devices and/or methods for such rearrangement of articles during conveyance of the articles are now well known.

Particular difficulty has sometimes been encountered, however, in handling some articles during conveyance, including, for example, at least some types of articles, such as, for example, unstable articles, articles having force type restrictions, and/or articles to be conveyed in article non-contact relationship between at least some locations, or processing stations.

Thus, while devices and/or methods are now known for conveying articles, including cans, between locations or processing stations, and/or controlling spacing between the articles, such devices and/or methods have not been completely successful, at least for some uses, due, at least in part, in failing to adequately and efficiently handle the articles, in failing to eliminate, or at least minimize, article contact with other articles, in requiring use of extensive spacing between locations or processing stations, in requiring use of extensive article path travel between locations or processing stations where line and/or spacing adjustment is required during conveyance of the articles, and/or in not conveying the articles at sufficiently high speeds.

SUMMARY OF THE INVENTION

This invention provides improved apparatus and method for article conveyance, provides improved line and/or spacing adjustment during article conveyance, is useful for article spacing and/or adjustment, or rearrangement, of the articles during conveyance between single and multiple lines (including operation in a single to multiple line mode or, alternately, in a multiple to single line mode), is useful in connection with conveyance of articles in article non-contact relationship and/or at higher speeds between different locations or processing stations, and is useful in connection with more difficult conveyance of articles such as light, unstable, and/or force restricted articles, or containers, such as, for example, cans (including non-magnetically responsive or weakly magnetically responsive cans) and bottles (including plastic bottles).

For operation in single to multiple line mode, articles in single line, or file, received on a receiving path at an adjusting unit of the apparatus, are formed, or rearranged, into multiple lines, or files, and/or are adjustably spaced during conveyance in the multiple lines so that the spaced articles are discharged from the adjusting unit on a discharging path in multiple lines, with the articles in the multiple lines on the discharging path being offset from one another and having a preselected spacing between adjacent articles, such as, if needed, spacing of the articles a distance from one another in each of the multiple lines equal to the spacing between articles on the receiving path.

For operation in multiple to single line mode, articles in multiple line, or file, received on a receiving path at the adjusting unit of the apparatus, are formed, or rearranged, into a single line, or file and/or are adjustably spaced during conveyance so that the spaced articles are discharged in single line from the adjusting unit at a discharging path, with the spacing of the articles on the receiving and discharging paths including spacing capabilities as described above in connection with operation in single to multiple line mode.

Rearrangement of the articles between single and multiple lines and/or space adjustment between the articles is effected during conveyance of the articles by a plurality of article actuators, each preferably including a disk having a predetermined non-mechanical force, preferably negative pressure, established thereat to selectively establish and maintain engagement of the articles with the peripheral portions of the disks.

It is therefore an object of this invention to provide improved article conveying apparatus and method.

It is another object of this invention to provide improved article conveying apparatus and method capable of efficient operation and/or operation at higher speeds.

It is another object of this invention to provide improved article conveying apparatus and method having line and/or spacing adjustment.

It is still another object of this invention to provide improved apparatus and method for efficiently conveying and handling articles in article non-contact relationship with controllable spacing between the articles.

It is still another object of this invention to provide improved apparatus and method for conveying articles and rearranging the articles between single and multiple lines during conveyance.

It is still another object of this invention to provide improved apparatus and method for conveying articles and rearranging the articles between single and multiple lines during conveyance of the articles within a limited area.

It is still another object of this invention to provide improved apparatus and method using a predetermined non-mechanical force, preferably negative pressure, for conveying articles and rearranging the articles between single and multiple lines during conveyance.

It is still another object of this invention to provide improved apparatus and method for conveying articles and rearranging the articles between single and multiple lines during conveyance using article actuators each having a disk with negative pressure thereat for selectively establishing and maintaining controlled article engagement with the peripheral portions of the disks to effect article conveyance and line rearrangement during conveyance.

It is still another object of this invention to provide improved apparatus and method for conveying articles in article non-contact relationship and rearranging the articles between single and multiple lines during conveyance with the articles being space-wise adjustable during conveyance so that the articles on the discharge path can be spaced from one another in a predetermined manner with respect to the articles on the receiving path.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiments of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which:

FIG. 4 is a top sketch illustrating article movement between the disks shown in FIGS. 1 and 3; and FIG. 5 illustrates, by top view, an alternative embodiment for use of multiple apparatus according to this invention for receiving articles from a pair of processing stations and providing rearranged articles to a third processing station.

DESCRIPTION OF THE INVENTION

Figure 1:
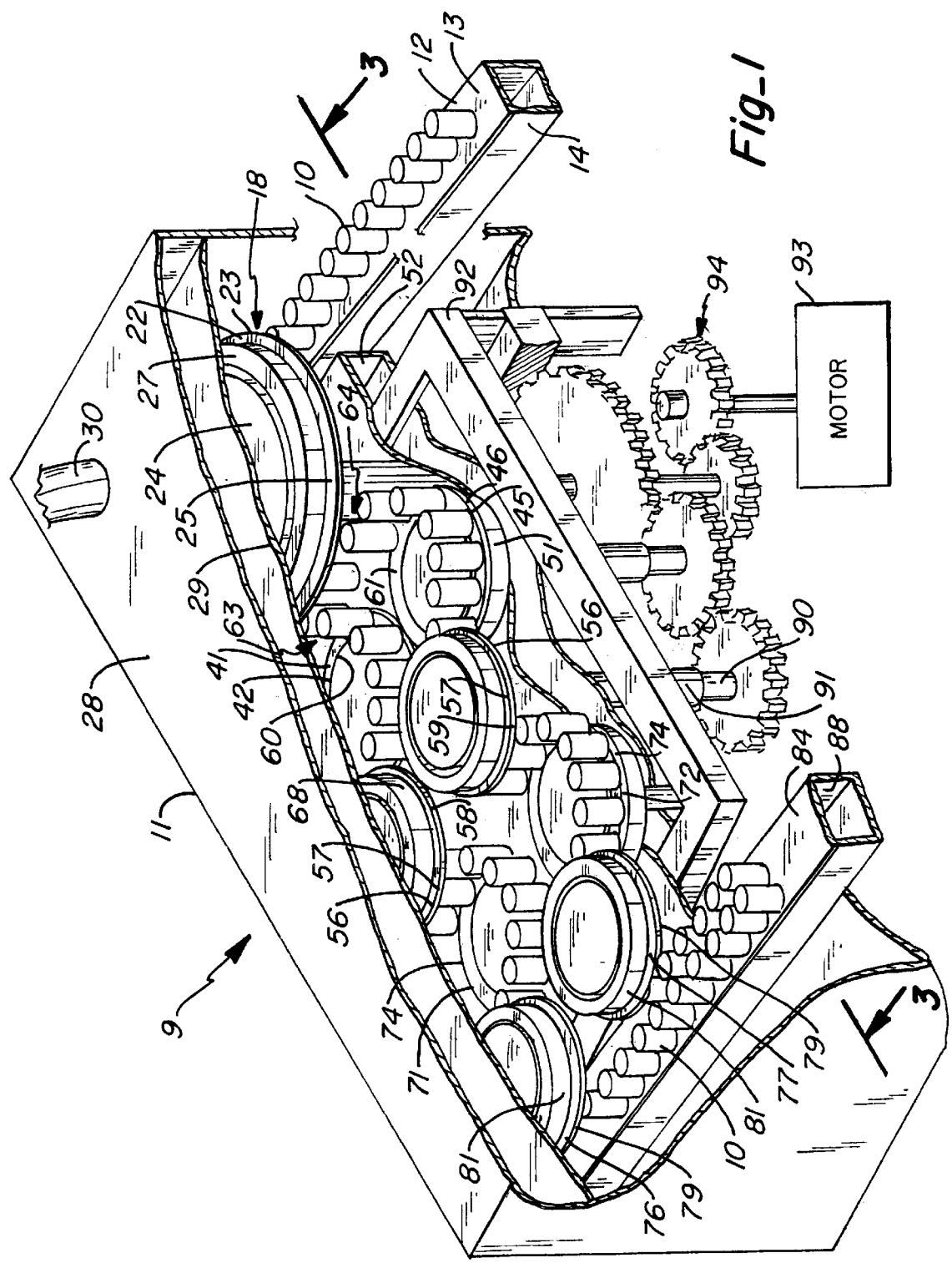
FIG. 1 is a cut-away perspective view of the apparatus of this invention.

As shown in the drawings, apparatus 9 of this invention receives, conveys, and discharges articles 10, with articles 10 being received by adjusting unit 11 from a conveyor providing a receiving path for the articles, with adjusting unit 11 rearranging the received articles between single and multiple lines and/or adjusting spacing as needed between articles in the lines, and with the rearranged articles being discharged from the adjusting unit on a second conveyor providing a discharging path for the articles.

While articles 10 have been illustrated in the drawings as cans, it is meant to be realized that other types of articles could also be conveyed by apparatus according to this invention, including, for example, other types of containers, so long as the articles to be conveyed are sufficiently light in weight and configured to be acted upon in the same manner as shown and described herein.

As shown in FIGS. 1 through 4, for operation in single to multiple line mode, adjusting unit 11 of apparatus 9 receives articles 10 in single line, or file, on a receiving path provided at top surface 12 of conveyor 13 (preferably a movable apertured conveyor belt), with conveyor 13 preferably having a negative pressure (as used herein, negative pressure is meant to include vacuum or near vacuum) chamber, or plenum, 14 extending under and along the receiving path provided by top surface 12 of conveyor 13, with chamber 14 having apertures (not shown) in the top surface to pull, or urge, articles 10 downwardly into engagement with the receiving path provided by top surface 12 of conveyor 13.

Figure 2:
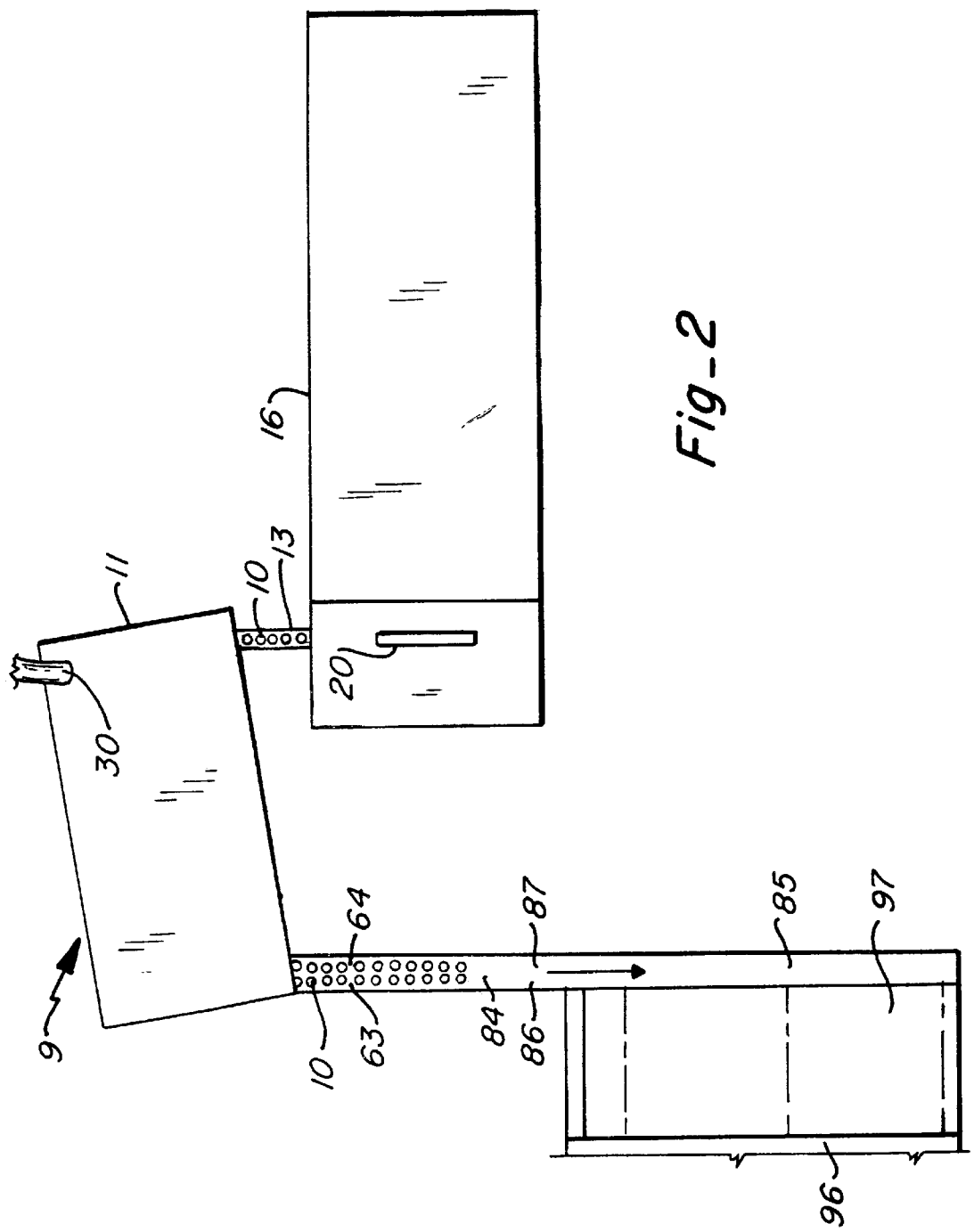
FIG. 2 is a top view of the apparatus, as shown in FIG. 1, positioned to receive articles from a first processing station and discharge articles to a second processing station.

As indicated in FIG. 2, the receiving path provided by conveyor 13 may be used, during operation in single to multiple line mode, to convey the articles in single line from a first location, or processing station, 16 to article transfer position 18 (as illustrated in FIGS. 1 and 4) within adjusting unit 11 of apparatus 9.

During operation in single to multiple line mode, processing station 16 can be, for example, a can decorator, when cans are the articles to be conveyed, with the cans discharged therefrom onto conveyor 13 being maintained in can non-contact relationship, such as, for example, being discharged from processing station 16 on a conventional wheel type conveyor 20 having negative pressure established thereat, and depositing the cans in can non-contact relationship on conveyor 13 (it is important that the cans be maintained in non-contact, or spaced, relationship with respect to one another when conveyed from a decorator, for example, since the sides of the cans could be easily damaged by contact with other cans).

Figure 3:
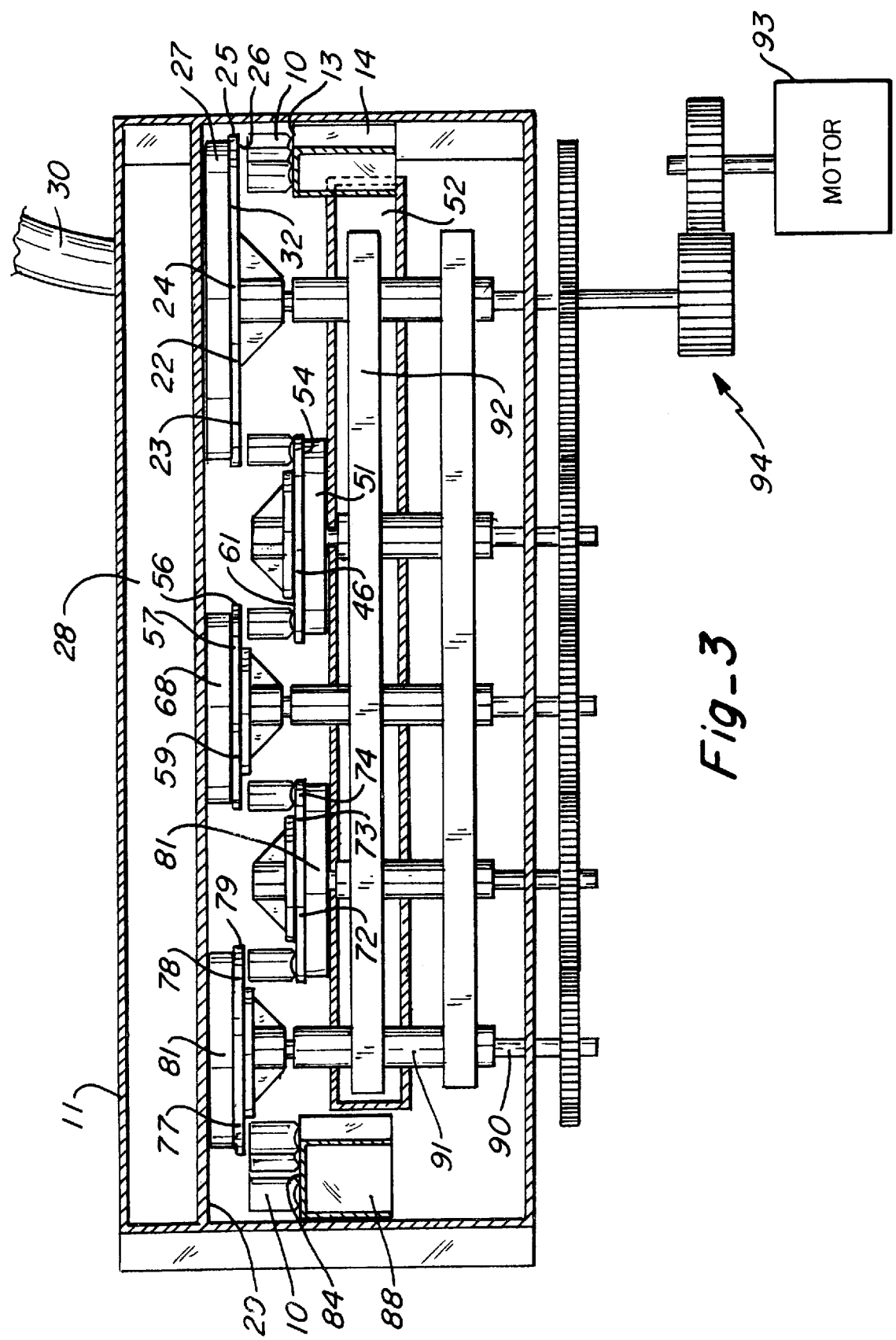
FIG. 3 is a side-section view of the apparatus taken along lines 3—3 of FIG. 1.

As indicated in FIGS. 1 and 3, articles 10 on conveyor 13 providing a receiving path are conveyed to article transfer position 18 at adjusting unit 11 with the tops (normally open tops when the articles to be conveyed are cans) of the articles adjacent to the bottom of a first article actuator 22, shown in the drawings as an actuator element that includes a first disk 23, constrained to rotation with central portion 24 and having a peripheral portion 25 (the spacing between top surface 12 of conveyor 13 and bottom surface 26 of peripheral portion 25 of disk 23 is slightly greater than the height of articles to be conveyed, as best indicated in FIG. 3, so that the spacing is sufficient to enable articles to pass between the receiving path provided by top surface 12 of conveyor 13 and peripheral portion 25 of disk 23 at article transfer position 18).

First circular plenum, or chamber, section 27 is associated with first article actuator 22 (and could be considered as a part of actuator 22, as could the additional circular plenum sections associated with the additional article actuators hereinafter discussed). Plenum section 27, however, is fixed in position and does not rotate with disk 23 of first actuator 22 (as is also true with respect to the additional circular plenum sections associated with the additional article actuators hereinafter discussed).

Plenum section 27 has negative pressure established therein by communication with upper main air chamber, or plenum, 28 having bottom wall 29 extending across the top of plenum section 27 with openings extending through bottom wall 29 at the portion thereof covering the top of plenum section 27 (plenum section 27 could also have a separate top wall with openings therein aligned with the openings in the portion of bottom wall 29 of upper main chamber 28 extending over plenum section 27, or plenum section 27 and upper main chamber 28 could be formed as a common plenum, or chamber, by eliminating the portion of bottom wall 29 of upper main chamber 28 extending over plenum section 27).

As indicated in FIG. 1, upper main chamber 28 is connected with a conventional blower, or the like, through conduit 30, to establish negative pressure within main chamber 28.

While not specifically shown, other predetermined non-mechanical forces could be utilized in some cases as an alternative to negative pressure as described herein, including, for example, magnetic forces where magnetic cans are to be conveyed and adjusted in line and/or spacing, in which case, the plenums and chambers described herein would be replaced by units supplying the alternative non-mechanical force.

As indicated in FIG. 3, bottom wall 32 of plenum section 27 is positioned above peripheral portion 25 of disk 23 of first actuator 22 and, as indicated in FIG. 4, has a pair of elongated arcuate openings 33 and 34 therein with arcuate opening 34 being radially spaced inwardly of arcuate opening 33 and extending a greater distance than does arcuate opening 33. Arcuate openings 33 and 34 extend over peripheral portion 25 of disk 23 of first actuator 22 with arcuate opening 33 extending along outer part 35 (and hence near the outer side, or edge) of peripheral portion 25 and arcuate opening 34 extending along inner part 36 (and hence near the inner side, or edge) of peripheral portion 25.

Arcuate openings 33 and 34 (as well as the arcuate openings in the remainder of the circular plenums hereinafter discussed) may be considered negative pressure controllers in that each selectively determines the application of negative pressure to specific sections of the associated disk peripheral portions.

Peripheral portion 25 of disk 23 of first actuator 22 has a first series, or group, of apertures 38 therein opening through outer part 35 of peripheral portion 25 of disk 23 so as to be alignable with arcuate opening 33 in bottom wall 32 of circular plenum section 27 during a portion of each complete revolution of rotatable disk 23, and a second series, or group, of apertures 39 therein opening through inner part 36 of peripheral portion 25 of disk 23 so as to be alignable with arcuate opening 34 in bottom wall 32 of circular plenum section 27 during a portion of each complete revolution of rotatable disk 23.

Apertures 38 and 39 (as well as the apertures in the peripheral portions of the disks of the additional article actuators described herein) extend entirely around the outer and inner parts 35 and 36 of peripheral portion 25 of disk 23 and may be circular as shown in the drawings, but could have other configurations so long as the apertures (circular or otherwise) are smaller than the disk engaging surfaces of the article and are of sufficient size to allow adequate negative pressure to be applied to the article to urge the article toward engagement with the peripheral portions of the disks and to maintain the articles in engagement with the peripheral portions of the disks until the negative pressure is terminated.

As indicated in FIGS. 1, 3 and 4, disk 23 is positioned so that both outer part 35 and inner part 36 peripheral portion 25 extend over top surface 12 of conveyor 13 at article transfer position 18 and so that outer part 35 and inner part 36 also extend over different ones of peripheral portion 41 of rotatable disk 42 of second article actuator 43 and peripheral portion 45 of rotatable disk 46 of third article actuator 47.

As best shown in FIG. 4, each series of apertures and 39 are radially offset from one another a distance such that each of adjacent apertures in each series of apertures are over alternate ones of the articles received at disk 23 from conveyor 13 (i.e., apertures 38 are spaced from one another a distance equal to the spacing between the centers of alternate ones of articles received at article transfer position 18, and apertures 39 are likewise spaced from one another a distance equal to the spacing between the centers of alternate ones of articles received at article transfer position 18) whereby each adjacent pair of incoming articles are over different ones of apertures 38 (opening through outer part 35 of peripheral portion 25 of disk 23) and 39 (opening through inner part 36 of peripheral portion 25 of disk 23).

As also best shown in FIG. 4, second and third article actuators 43 and 47 are offset from first article actuator 22 to allow arcuate opening 33 of plenum section 27 to extend along outer part 35 of peripheral portion 25 of disk 23 from article transfer position 18 (at first actuator 22) to above a part of peripheral portion 41 of disk 42 of second article actuator 43, and to allow arcuate opening 34 of plenum section 27 to extend along inner part 36 of peripheral portion 25 of disk 23 from article transfer position 18 (at first actuator 22) to above a part of peripheral portion 45 of disk 46 of third article actuator 47.

Apertures 38 and 39 in peripheral portion 25 of disk 23 of first article actuator 22 are thus offset with respect to one another and are spaced from one another a sufficient distance so that each article 10 on conveyor 13 is pulled, or urged, upwardly from top surface 12 of conveyor 13 into engagement with bottom surface 26 of peripheral portion 25 of disk 23 at article transfer position 18 (the negative pressure established below top surface 12 of conveyor 13 is terminated at article transfer position 18), with the articles being alternately acted upon by negative pressure through arcuate opening 33 in plenum section 27 and an aperture 38 in peripheral portion 25 of disk 23, and then through arcuate opening 34 in plenum section 27 and an aperture 39 in peripheral portion 25 of disk 23 so that each article is thus successively removed from conveyor 13 (when providing a receiving path) and carried, or conveyed, about an arcuate path by rotation of disk 23 of first article actuator 22.

As best indicated in FIG. 4, a single group, or row, of apertures 49 extends around peripheral portions 41 and 45 of rotatable disks 42 and 46 of second and third article actuators 43 and 47 with the spacing between apertures 49 being selected to have one (or more) apertures over each article (as is also true with respect to the apertures of all disks described herein). Actuators 43 and 47 are otherwise similar in structure to actuator 22 except that, as best shown in FIGS. 1 and 3, disks 42 and 46 face upwardly and have circular plenum sections 51 positioned below peripheral portions 41 and 45 of disks 42 and 46.

Plenum sections 51 communicate with lower main air chamber, or plenum, 52, positioned below plenum sections 51, in the same manner as above described with respect to plenum section 27 communicating with upper main air chamber 28. While not specifically shown, lower main air chamber 52 is connected with a conventional blower, or the like, or, alternately, with upper main air chamber 28 through a conventional conduit extending therebetween.

Plenum sections 51 have arcuate openings 53 therein opening through top wall 54 so that arcuate openings 53 extend under peripheral portions 41 and 45 of disks 42 and 46 of associated second and third actuators 43 and 47, with plenum section 51 associated with second actuator 43 extending from a position under peripheral portion 25 of disk 23 of first actuator 22 adjacent to and below the point of termination of arcuate opening 33 in plenum section 27 to a position adjacent to and under peripheral portion 56 of disk 57 of fourth article actuator 58, and with plenum section 51 associated with third actuator 47 extending from a position under peripheral portion 25 of disk 23 of first actuator 22 adjacent to and below the point of termination of arcuate opening 34 in plenum section 27 to a position adjacent to and under peripheral portion 56 of disk 57 of fifth article actuator 59.

Peripheral portions 41 and 45 of disks 42 and 46 of second and third actuators 43 and 47 are positioned below peripheral portion 25 of disk 23 of first actuator 22 (with a spacing therebetween, as best indicated in FIG. 3, substantially the same as between top surface 12 of conveyor 13 and peripheral portion 25 of disk 23 as brought out above to allow articles 10 to pass therebetween) with peripheral portions 41 and 45 being spaced from one another below peripheral portion 25 a distance such that articles 10 carried by rotating disk 23 are first brought to a position with peripheral portion 25 of disk 23 over peripheral portion 41 of disk 43 and then later over peripheral portion 45 of disk 46.

When articles 10 are moved by rotation of disk 23 to a position over peripheral portion 41 of disk 42, the article then so positioned is urged downwardly toward engagement of the bottom of the article with top surface 60 of peripheral portion 41 of disk 42 due to negative pressure applied to the article through aperture 49 in peripheral portion 41 of disk 42 and arcuate opening 53 in plenum section 51 (negative pressure maintaining the article in engagement with peripheral portion 25 of disk 23 is terminated since arcuate opening 33 extends only to a point over peripheral portion 41 of disk 42 where negative pressure is first applied to the article at peripheral portion 41 of disk 42).

In like manner, when articles 10 are moved by rotation of disk 23 to a position over peripheral portion 45 of disk 46, the article then so positioned is urged downwardly toward engagement of the bottom of the article with top surface 61 of peripheral portion 45 of disk 46 due to negative pressure applied to the article through aperture 49 in peripheral portion 45 of disk 46 and arcuate opening 53 in plenum section 51 (negative pressure maintaining the article in engagement with peripheral portion 25 of disk 23 is terminated since arcuate opening 34 extends only to a point over peripheral portion 45 of disk 46 where negative pressure is first applied to each article at peripheral portion 45 of disk 46).

Articles 10 are thus alternately transferred from peripheral portion 25 of disk 23 of first article actuator 22 to peripheral portion 41 of disk 42 of second article actuator 43 and to peripheral portion 45 of disk 46 of third article actuator 47. Thus, multiple lines 63 and 64 of articles 10 are formed at second and third article actuators 43 and 47.

Additional disks may be utilized, if and as needed, to further transfer, or convey, articles in multiple lines 63 and 64 for discharge of the articles in multiple lines during single to multiple line mode operation.

As can be appreciated from the foregoing, disks 23, 42, and 46 enable article adjustment between single and multiple lines and spacing of the articles. For adjustment of spacing between the articles in the multiple lines, additional disks may be utilized, if, and as, needed, with such disks further transferring, or conveying, the articles in multiple lines 63 and 64 (three additional pairs of disks, as now preferred, are illustrated, but the number of pairs of disks utilized may be varied as needed for particular applications).

With additional pairs of disks utilized, as indicated in FIGS. 1, 3, and 4, rotation of disks 42 and 46 of second and third article actuators 43 and 47 causes articles held in engagement with peripheral portions 41 and 45 of second and third actuators 43 and 47 to be conveyed to positions under peripheral portions 56 of disks 57 of fourth and fifth article actuators 58 and 59 with the articles being spaced between the peripheral portions a distance like that between peripheral portion 25 of disk 22 and peripheral portions 41 and 45 of disks 42 and 46 to allow articles to pass therebetween.

Disks 57 of fourth and fifth article actuators 58 and 59 are rotatable and fourth and fifth article actuators 58 and 59 are similar in structure to article actuators 43 and 47, except facing downwardly in the same manner as does first article actuator 22.

As indicated in FIG. 4, peripheral portions 56 of disks 57 of fourth and fifth article actuators 58 and 59 have a row of apertures 66 extending entirely therearound, and each peripheral portion 56 has a circular plenum section 68 positioned thereat, with plenum sections 68 having arcuate openings 69 therein, and with plenum sections 68 being in communication with upper main air plenum 28 in the same manner as described above with respect to plenum section 27.

The negative pressure established at peripheral portion 56 of disk 57 of fourth article actuator 58 urges the articles upwardly from engagement with peripheral portion 41 of disk 42 of second actuator 43 and into engagement with peripheral portion 56 of disk 57 of fourth actuator 58 (the negative pressure established through arcuate opening 53 in plenum section 51 and aperture 49 in peripheral portion 41 of disk 42 of second actuator 43 is terminated at the section of peripheral portion 41 that extends below the point where negative pressure is first applied to the article at peripheral portion 56 of disk 57 of fourth actuator 58 since arcuate opening 53 terminates thereat).

In like manner, the negative pressure established at peripheral portion 56 of disk 57 of fifth article actuator 59 urges the articles upwardly from engagement with peripheral portion 45 of disk 46 of third actuator 47 and into engagement with peripheral portion 56 of disk 57 of fifth article actuator 59 (the negative pressure established through arcuate opening 53 in plenum section 51 and aperture 49 in peripheral portion 45 of article actuator 47 is terminated at the section of peripheral portion 45 that extends below the point where negative pressure is first applied to the article through peripheral portion 56 of disk 57 of fifth actuator 59 since arcuate opening 53 terminates thereat).

Rotation of disks 57 of fourth and fifth article actuators 58 and 59 conveys the articles toward discharge, which can include conveying the articles in multiple lines through additional pairs of article actuators prior to discharge. As shown in the drawings, two additional pairs of article actuators, in addition to fourth and fifth article actuators 58 and 59, are illustrated to further transfer, or convey, articles 10 in multiple lines 63 and 64.

As shown in FIGS. 1, 3, and 4, sixth and seventh article actuators 71 and 72, each including disk 73 having peripheral portion 74, are positioned so that peripheral portion 74 of disk 73 of sixth article actuator 71 passes below peripheral portion 56 of disk 57 of fourth actuator 58 and peripheral portion 74 of disk 73 of seventh article actuator 72 passes below peripheral portion 56 of disk 57 of fifth actuator 59.

Additionally, as shown, eighth and ninth article actuators 76 and 77, each including disk 78 having peripheral portion 79, are positioned so that peripheral portion 79 of disk 78 of eighth article actuator 76 passes above peripheral portion 74 of disk 73 of sixth actuator 71 and peripheral portion 79 of disk 78 of ninth article actuator 77 passes above peripheral portion 74 of disk 73 of seventh actuator 72.

Disks 73 and 78 of article actuators 71, 72, 76, and 77 are rotatable and are similar in structure to disks 42, 46, and 57 and each has apertures 80 extending entirely around the peripheral portion of each disk. In addition, each disk 73 and 78 has a circular plenum section 81 thereat that is similar in structure to plenum sections 51 and 68 with each plenum section having an arcuate opening 82 so that articles 10 are urged from engagement with the peripheral portions of the adjacent upstream disk and are urged into engagement with the peripheral portion of the next adjacent downstream disk as negative pressure is terminated at the upstream disk and established at the next adjacent downstream disk as described above with respect to article actuators 22, 43, 47, 58, and 59.

Conveyor 84 (preferably a movable apertured conveyor belt or belts) extends below the peripheral portions of the last pair of disks of the article actuators utilized (actuator elements 76 and 77 as illustrated in FIG. 4 it is meant to be realized, however, that conveyor 84 could extend, for some applications, adjacent to pairs of actuators other than actuators 76 and 77 as described herein with the resulting then unused pairs of actuators downstream from the pairs of actuators having conveyor 84 extending adjacent thereto being eliminated, and with it also being meant to be realized that conveyor 84 if extended above second and third actuators 43 and 47 or above sixth and seventh actuators 71 and 72 would lift the articles from these actuators) so that conveyor 84 provides a discharging path from adjusting unit 11, when operating in single to multiple line mode, for receiving articles from the last pair of article actuators utilized and then conveying the articles along each of the multiple article lines to article discharge position 85 (as indicated in FIG. 2).

As indicated in FIGS. 1, 2, and 4, conveyor 84 extends below peripheral portions 79 of disks 78 of article actuators 76 and 77 so that articles 10 are deposited on opposite halves 86 and 87 of conveyor 84 (conveyor 84 has negative pressure established at the belt by chamber, or plenum, 88) and the articles are thereafter carried, or conveyed, to discharge position, or end, 85 of conveyor 84, with opposite halves 86 and 87 of conveyor 84 conveying articles in multiple lines 63 and 64, respectively, and/or with the articles on each of multiple lines being spaced from the next adjacent article a predetermined distance, such as, if needed, being spaced the same distance from one another in each of the multiple lines as received on single line conveyor 13.

Spacing adjustment may be effected by utilizing article actuators having disks with different radii and/or by rotating the disks at different rotational speeds. By way of example, a spacing adjustment from four inch (4") centers at conveyor 13 (and hence at eight inch (8") centers when first formed into the multiple lines) to four inch (4") centers on each of the multiple lines may be effected (as could, by way of further example, effecting three and one-half inch (3½") centers at discharge conveyor 84) utilizing disks having different radii and/or by rotating the disks at different rotational speeds.

By using a plurality of article actuators having disks in each of the multiple lines and with each of the disks in each multiple line having a progressively smaller radius in the downstream conveying direction (a decrease of disk radius of about one inch for each disk from the radius of the next upstream disk may be utilized, by way of specific example) and/or by progressively decreasing the rotational speed of each successive disk in the downstream direction (a decrease in rotational speed of about fifteen percent for each disk may be utilized, again by way of specific example), needed spacing adjustment can be effected.

As indicated in FIGS. 1 and 3, each of the disks of the article actuators utilized is preferably (but not necessarily) horizontally positioned with the central section mounted for rotation on vertically extending shafts 90 (where the disks are to be horizontal) as, for example, by positioning shafts 90 for rotation within sleeves 91 mounted on support structure 92, and rotating shafts 90 by electric motor 93 driving the shafts through appropriate gearing 94 to achieve a common speed of rotation or rotation at different speeds as needed.

For operation in single to multiple line mode, as indicated in FIG. 2, the articles at discharge end 85 of conveyor 84 are introduced into a second location, or processing station 96 (such as, for example, an oven when cans are the articles conveyed). While not specifically shown, the articles at discharge end 85 of conveyor 84 can be removed from conveyor 84 and moved into processing station 96 in a known manner, including, for example, by a conventional conveyor 97.

For operation in multiple to single line mode, the articles are rearranged from multiple lines to single line by reversing the direction of flow of articles so that multiple lines are received on a receiving path provided by conveyor 84 and articles in single line are discharged by apparatus 9 onto a discharging path provided by conveyor 13.

Other arrangements can be effected utilizing this invention for operation in single to multiple line mode (or, alternately, by reversing the direction of article flow, from multiple to single line mode) including, for example, and as indicated in FIG. 5, use of a pair of apparatus 9A and 9B, each being apparatus as above described as apparatus 9.

As shown, each apparatus 9A and 9B receives articles 10 from different ones of single line conveyors 13A and 13B, each being conveyors as above described as conveyor 13, and each being positioned to receive articles outputted from different ones of dual processing stations 16A and 16B to provide multiple lines of spaced articles, with apparatus 9A outputting multiple lines 63A and 64A and apparatus 9B outputting multiple lines 63B and 64B on opposite halves of conveyors 84A and 84B. The articles are then discharged from conveyors 84A and 84B at discharge ends 85A and 85B for conveyance therefrom along opposite halves 97A and 97B of conventional conveyor 97 to processing station 98. Processing stations 16A and 16B may be, for example when cans are the articles to be conveyed, can decorators and processing station 98 may be, for, example an oven having belt conveyor 97 of sufficient width to receive cans thereacross from both conveyors 84A and 84B.

During operation, the articles are normally conveyed at high speed (about 1600 articles per minute to about 2400 articles per minute) and articles received on the receiving path are automatically rearranged between single and multiple lines depending upon the mode of. operation utilized, and/or may be automatically adjusted in spacing while being conveyed, with the articles being then automatically conveyed to a discharging path.

As can be appreciated from the foregoing, this invention provides improved apparatus and method for efficiently conveying articles, such as, for example, containers such as cans, in article non-contact relationship and/or at high speeds, rearranging the articles between single and multiple lines during conveyance, and/or adjusting the spacing, as needed, between articles during conveyance.

What is claimed is:

1. An article conveying apparatus operable in at least one of article single to multiple line mode and article multiple to single line mode, said apparatus comprising:

a receiving path for receiving articles;

a discharging path for discharging articles; and an adjusting unit for receiving the articles from said receiving path and discharging adjusted articles to said discharging path, said adjusting unit including a plurality of article actuators having at least first, second, and third article actuators spaced from and adjacent to one another with said first article actuator being adjacent to one of said receiving and discharging paths and said second and third article actuators being adjacent to the other of said receiving and discharging paths, and said plurality of article actuators having a predetermined non-mechanical force established thereat cause the articles received from said receiving path to be transferred between said plurality of article actuators to effect adjustment of the received articles by at least one of rearranging the received articles between single and multiple lines and spacing the received articles a predetermined distance from one another.

2. The apparatus of claim 1 wherein the received articles are cans, wherein said receiving path receives cans from a first processing station, and wherein said discharging path discharges said cans to a second processing station.

3. The apparatus of claim 1 wherein said first article actuator, when operating in said single to multiple line mode, removes articles from said receiving path, and said second and third article actuators, when operating in said single to multiple line mode, discharges the adjusted articles to said discharging path.

4. The apparatus of claim 1 wherein said second and third article actuators, when operating in said multiple to single line mode, removes articles from said receiving path, and said first article actuator, when operating in said multiple to single line path, discharges the adjusted articles to said discharging path.

5. The apparatus of claim 1 wherein said predetermined non-mechanical force is negative pressure.

6. The apparatus of claim 5 wherein said adjusting unit includes plenum sections associated with said plurality of article actuators to establish said negative pressure thereat to effect said adjustment of the articles.

7. The apparatus of claim 1 wherein said receiving path, discharging path, and article actuators cause the articles to be conveyed in article non-contact relationship.

8. The apparatus of claim 7 wherein said receiving path, discharging path, and article actuators are configured to convey the articles at high speed in article non-contact relationship within a limited space between said receiving path and said discharging path.

9. An article conveying apparatus, said apparatus comprising:
   a receiving path for receiving articles;
   an adjusting unit for receiving the articles from said receiving path said adjusting unit including a plurality of article actuators having at least three article actuators a first one of which operates as a single article actuator and second and third ones of which operate as a pair of article actuators that act in conjunction with said first one of said article actuators, and said plurality of article actuators having a predetermined non-mechanical force established thereat to cause the articles received from said receiving path to be transferred between said plurality of article actuators to effect adjustment of the received articles by at least one of rearranging the received articles between single and multiple lines and spacing the received articles a predetermined distance from one another; and
   a discharging portion for receiving the adjusted articles from said adjusting unit.

10. The apparatus of claim 9 wherein each of said first, second and third ones of said plurality of article actuators includes a disk for engaging the articles to be conveyed, and wherein said predetermined non-mechanical force is established at said disks of said first, second and third ones of said article actuators.

11. The apparatus of claim 10 wherein said disks of said first, second and third ones of said article actuators include a peripheral portion for engaging the articles to be conveyed.

12. The apparatus of claim 9 wherein said adjusting unit includes at least one additional pair of article actuators each of which operates in conjunction with different ones of said second and third ones of said article actuators.

13. The apparatus of claim 9 wherein said adjusting unit includes between one and three additional pairs of article actuators with different ones of each pair of said additional pairs of article actuators being associated with different ones of said second and third article actuators.

14. An article conveying apparatus, said apparatus comprising:
   a receiving path for receiving articles;
   an adjusting unit for receiving the articles from said receiving path, said adjusting unit including a first article actuator having a first rotatable disk and second and third rotatable disks for receiving the articles from said first rotatable disk;
   a plurality of plenum sections establishing negative pressure at said first, second and third rotatable disks whereby said negative pressure in conjunction with rotation of said disks effects adjustment of the received articles by at least one of rearranging the received articles between single and multiple lines and spacing the received articles a predetermined distance from one another; and
   a discharging path for receiving said adjusted articles from said adjusting unit.

15. The apparatus of claim 14 wherein each of said first, second and third rotatable disks has a peripheral portion adjacent to different ones of said plurality of plenum sections whereby negative pressure is established at each of said first, second and third rotatable disks to cause selective engagement of the articles then at said adjusting unit for effecting said adjustment of the received articles.

16. The apparatus of claim 15 wherein said peripheral portions of said first, second and third rotatable disks have apertures therein, and wherein said plurality of plenum sections have openings therein opening to predetermined ones of said apertures in said first, second and third rotatable disks for selectively establishing negative pressure at said peripheral portions of said first, second and third rotatable disks to thereby control said adjustment of the articles.

17. The apparatus of claim 16 wherein said peripheral portions of said second and third rotatable disks have apertures extending therearound, and wherein said peripheral port ion of said first rotatable disk has dual groups of apertures extending therearound with said dual groups of apertures establishing negative pressure at different ones of the articles then at said adjusting unit.

18. The apparatus of claim 15 wherein at least one of the radii and the rotational speed of said first, second and third rotatable disks are caused to be different, relative to one another, for effecting said predetermined spacing between the articles in said multiple lines of articles at said discharge path.

19. The apparatus of claim 15 wherein said first, second and third rotatable disks are substantially horizontally positioned and with said second and third rotatable disks being vertically spaced from said first rotatable disk a distance just sufficient to enable articles to pass therebetween.

20. The apparatus of claim 15 wherein said adjusting unit includes at least fourth and fifth rotatable disks each of which is operable in conjunction with different ones of said second and third rotatable disks.

21. The apparatus of claim 20 wherein said adjusting unit includes sixth and seventh rotatable disks each of which is operable in conjunction with different ones of said fourth and fifth rotatable disks.

22. The apparatus of claim 21 wherein said adjusting means further includes eighth and ninth rotatable disks each of which is operable in conjunction with different ones of said sixth and seventh rotatable disks.

23. An article conveying apparatus having line and spacing adjustment, said apparatus comprising:

a receiving conveyor for receiving articles in single file;

a first rotating disk having a peripheral portion adjacent to said receiving conveyor;

a first plenum section at said peripheral portion of said first rotating disk, said first plenum section having a negative pressure controller for establishing selective application of negative pressure at said peripheral portion of said first rotating disk whereby articles at said receiving conveyor are urged toward engagement with said peripheral portion of said first rotating disk;

a pair of second rotating disks each of which has a peripheral portion adjacent to said peripheral portion of said first rotating disk;

second and third plenum sections at different ones of said peripheral portions of said pair of second rotating disks, said second and third plenum sections having negative pressure controllers for establishing selective application of negative pressure at said peripheral portion of each of said pair of second rotating disks whereby articles on said peripheral portion of said first rotating disk are urged toward engagement with alternate ones of said peripheral portions of said pair of second rotating disks to thus rearrange the articles into multiple lines having a predetermined spacing therebetween while in engagement with said peripheral portions of said pair of second rotating disks; and a discharge conveyor for receiving said multiple lines of articles from said pair of second rotating disks and discharging the articles in said multiple lines.

24. The apparatus of claim 23 wherein said negative pressure controllers of said plenum sections include an arcuate opening in said plenum sections adjacent to said peripheral portions of associated ones of said first rotatable disk and said pair of second rotatable disks, and wherein peripheral portion of said first rotating disk and said peripheral portions of said pair of second rotating disks have apertures therein cooperable with said arcuate opening in said associated one of said plenum sections to urge said movement of articles toward engagement with said peripheral portions of said first rotating disk and said pair of second rotatable disks.

25. The apparatus of claim 24 wherein said apertures in said peripheral portion of said first rotatable disk includes first and second groups of spaced apertures cooperable with said arcuate opening of said first plenum section to effect said urging of the articles toward alternate engagement with said peripheral portions of said pair of second rotatable disks.

26. The apparatus of claim 23 wherein said apparatus includes between one and three additional pairs of rotating disks each having peripheral portions adjacent to one another with the peripheral portions of one of said additional pairs of rotating disks being adjacent to different ones of said peripheral portions of said pair of second rotating disks, and additional plenum sections at each of said peripheral portions of said between one and three additional pairs of rotating disks, said additional plenum sections having arcuate openings for causing application of negative pressure at said peripheral portions of each of said between one and three additional pairs of rotating disks whereby articles from each of said peripheral portions of said pair of second rotating disks are urged toward engagement with different ones of said peripheral portions of each of said between one and three additional pairs of rotating disks so that the articles are conveyed from said peripheral portions of said pair of second rotating disks through different ones of each of said between one and three additional pairs of third rotatable disks to said discharge conveyor.

27. A method for conveying articles, said method comprising:

receiving articles to be conveyed;

providing first, second, and third article actuators as a plurality of article actuators; and providing negative pressure at each of said article actuators to cause the received articles to be transferred between said plurality of article actuators to effect adjustment of the received articles by at least one of rearranging the received articles between single and multiple lines and spacing the received articles a predetermined distance from one another with said first article actuator receiving the articles, when operating in a single to multiple line mode, and discharging the adjusted articles, when operating in a multiple to single line mode, and with said second and third article actuators receiving the articles, when operating in said multiple to single line mode, and discharging the adjusted articles, when operating in said single to multiple line mode.

28. The method of claim 27 wherein said method includes maintaining the articles in non-contact relationship.

29. The method of claim 27 wherein said method includes conveying the articles at high speed and in article non-contact relationship within a limited space from said receiving conveyor to said discharge conveyor.

30. A method for conveying articles, said method comprising:

providing first second and third article actuators having rotatable disks with peripheral portions as a plurality of article actuators;

establishing negative pressure at said peripheral portions of said rotatable disks whereby the received articles are selectively urged toward engagement with said peripheral portions of said disks to effect adjustment of the received articles by at least one of rearranging the received articles between single and multiple lines and spacing the received articles a predetermined distance from one another; and discharging the adjusted articles.

31. The method of claim 30 wherein said method includes selectively urging the articles from said peripheral portion of said rotatable disk of said first article actuator toward said alternate engagement with different ones of said peripheral portions of said rotatable disks of said second and third article actuators to form said multiple lines of articles when the articles are received in said single line by said rotatable disk of said first article actuator, and selectively urging the articles from said peripheral portions of said rotatable disks of said second and third article actuators toward alternate engagement with said peripheral portion of said rotatable disk of said first article actuator to form said single line of articles when the articles are received in said multiple lines by said rotatable disks of said second and third article actuators.

32. The method of claim 31 wherein said method includes commencing said negative pressure at said peripheral portion of said rotatable disk of said second article actuator, and then later commencing said negative pressure at said peripheral portion of said rotatable disk of said third article actuator to effect said alternate engagement of the articles with different ones of said peripheral portions of said rotatable disks of said second and third article actuators to form said multiple lines of articles, and commencing said negative pressure at said peripheral portion of said rotatable disk of said first article actuator at different times to effect said alternate engagement of the articles with different parts of said peripheral portion of said rotatable disk of said first article actuator to form said single line of articles.

* * * * *